(12) United States Patent
Watarai

(10) Patent No.: US 9,963,200 B2
(45) Date of Patent: May 8, 2018

(54) BICYCLE CONTROL APPARATUS

(71) Applicant: Shimano Inc., Sakai, Osaka (JP)

(72) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 99 days.

(21) Appl. No.: 14/734,350

(22) Filed: Jun. 9, 2015

(65) Prior Publication Data

US 2016/0009341 A1    Jan. 14, 2016

(30) Foreign Application Priority Data

Jul. 14, 2014 (JP) ................. 2014-144069

(51) Int. Cl.
*B62M 25/08* (2006.01)
*B62K 23/06* (2006.01)
*F16H 59/02* (2006.01)

(52) U.S. Cl.
CPC ............ *B62M 25/08* (2013.01); *B62K 23/06* (2013.01); *F16H 59/02* (2013.01)

(58) Field of Classification Search
None
See application file for complete search history.

(56) References Cited

U.S. PATENT DOCUMENTS

| | | | | |
|---|---|---|---|---|
| 7,854,180 B2 * | 12/2010 | Tetsuka | ................. | B62K 23/06 74/473.12 |
| 8,712,656 B2 * | 4/2014 | Lee | ......................... | F16H 61/26 701/60 |
| 2003/0160420 A1 * | 8/2003 | Fukuda | ................. | B62M 25/08 280/260 |
| 2004/0176896 A1 | 9/2004 | Takeda et al. | | |
| 2005/0223840 A1 * | 10/2005 | Takamoto | ............. | B62M 25/08 74/502.2 |
| 2005/0227798 A1 * | 10/2005 | Ichida | .................... | B62K 23/06 474/81 |
| 2007/0207885 A1 * | 9/2007 | Watarai | ................. | B62M 25/08 474/70 |
| 2008/0087131 A1 * | 4/2008 | Tetsuka | ................. | B62K 23/02 74/502.2 |
| 2008/0168856 A1 * | 7/2008 | Tetsuka | ................. | B62K 23/06 74/502.2 |
| 2014/0290411 A1 * | 10/2014 | Kuroda | ................. | B62M 25/04 74/473.12 |

FOREIGN PATENT DOCUMENTS

| | | |
|---|---|---|
| DE | 602 00 875 T2 | 1/2005 |
| DE | 10 2012 017 787 A1 | 3/2013 |

\* cited by examiner

*Primary Examiner* — Justin Holmes
*Assistant Examiner* — Timothy Hannon
(74) *Attorney, Agent, or Firm* — Global IP Counselors, LLP

(57) ABSTRACT

A bicycle control apparatus is basically configured to control at least one shifting device having a plurality of gear stages. The bicycle control apparatus includes a shifting input device, at least one detection sensor and a controller. The at least one detection sensor detects the gear stage of the at least one shifting device. The controller controls the at least one shifting device. The controller controls the at least one shifting device to upshift or to downshift in a state in which the detected gear stage matches a prescribed condition, upon receiving the prescribed shift command is input via the shifting input device.

16 Claims, 9 Drawing Sheets

|  | FC | |
|---|---|---|
|  | Low | Top |
| 1st |  ← | DOWN ↙ |
| 2nd |  |  |
| 3rd | UP ← | → |
| 4th |  |  |
| 5th |  |  |
| 6th |  |  |
| 7th |  |  |
| 8th |  |  |
| 9th |  |  |
| 10th |  |  |

(CS on left axis)

FIG. 5

|  | | FC | |
|---|---|---|---|
| | | Low | Top |
| CS | 1st | | |
| | 2nd | ← | DOWN |
| | 3rd | | |
| | 4th | | |
| | 5th | UP | → |
| | 6th | | |
| | 7th | | |
| | 8th | | |
| | 9th | | |
| | 10th | | |

FIG. 6

|    | FC | | |
|----|-----|-----|-----|
| CS | Low | Mid | Top |
| 1st |  | ← → DOWN |  |
| 2nd |  |  | ← → DOWN |
| 3rd |  |  |  |
| 4th |  |  |  |
| 5th | UP ← → |  |  |
| 6th |  |  |  |
| 7th |  |  |  |
| 8th |  | UP ← → |  |
| 9th |  |  |  |
| 10th |  |  |  |

|   | FC | | |
|---|---|---|---|
| CS | | Low | Mid | Top |
| 1st | | | |
| 2nd | | DOWN | |
| 3rd | | | DOWN |
| 4th | UP | | |
| 5th | | | |
| 6th | | | |
| 7th | | | |
| 8th | | | |
| 9th | | UP | |
| 10th | | | |

FIG. 10

BICYCLE CONTROL APPARATUS

CROSS-REFERENCE TO RELATED APPLICATIONS

This application claims priority to Japanese Patent Application No. 2014-144069, filed on Jul. 14, 2014. The entire disclosure of Japanese Patent Application No. 2014-144069 is hereby incorporated herein by reference.

BACKGROUND

Field of the Invention

This invention generally relates to a bicycle control apparatus that controls at least one of a first shifting device having a plurality of gear stages and a second shifting device having a plurality of gear stages.

Background Information

A bicycle control apparatus is known that controls a first shifting device (for example, a front derailleur) and a second shifting device (for example, a rear derailleur) of a bicycle (see, for example, U.S. Pat. No. 8,712,656).

SUMMARY

A conventional bicycle control apparatus is required to reference a gear ratio table; therefore, when the sprocket is replaced with one having a different set of teeth, the setting of the table has to be changed.

One object of the present invention is to provide a bicycle control apparatus that can realize a simpler control.

The bicycle control apparatus according to the present invention is a device that controls at least one of a first shifting device having a plurality of gear stages and a second shifting device having a plurality of gear stages. The bicycle control apparatus comprises a shifting input device, at least one detection sensor and a controller. The shifting input device is for inputting a shift command. The at least one detection sensor detects the gear stage of at least one of the first shifting device and the second shifting device. The controller controls the first shifting device and the second shifting device. The controller controls at least one of the first shifting device and the second shifting device to upshift or to downshift upon determining a state exists in which the gear stage detected by the detection sensor matches a prescribed condition, and when a prescribed shift command is input via the shifting input device.

In this bicycle control apparatus, in a state in which the gear stage detected by the detection sensor matches a prescribed condition, when a user inputs a prescribed shift command via the shifting input device, the controller controls at least one of the first shifting device and the second shifting device to upshift or to downshift. Here, in a state that matches a prescribed condition, at least one of the first shifting device and the second shifting device is controlled to upshift or to downshift; therefore, a bicycle control apparatus that can realize a simpler control can be provided.

The at least one detection sensor can comprise a first detection sensor that detects the gear stage of the first shifting device and a second detection sensor that detects the gear stage of the second shifting device. The controller controls at least one of the first shifting device and the second shifting device to upshift or to downshift upon determining a state exists in which the gear stage detected by the first detection sensor and the gear stage detected by the second detection sensor match the prescribed condition, when the prescribed shift command is input via the shifting input device. In this case, since the gear stages of the first shifting device and the second shifting device are detected for the control, the gear stages can be detected even if the first shifting device and the second shifting device have three or more gear stages.

The controller can control the first shifting device to upshift when a first shift command is input via the shifting input device and upon determining a state exists in which the gear stage detected by the detection sensor matches at least one first shifting condition.

The controller can control the second shifting device to downshift when a first shift command is input via the shifting input device and upon determining a state exists in which the gear stage detected by the detection sensor matches at least one first shifting condition.

The controller can control the first shifting device to downshift when a second shift command is input via the shifting input device and upon determining a state exists in which the gear stage detected by the detection sensor matches at least one second shifting condition.

The controller can control the second shifting device to upshift when a second shift command is input via the shifting input device and upon determining a state exists in which the gear stage detected by the detection sensor matches at least one second shifting condition.

The bicycle control apparatus can further comprise a storage device that stores at least one coordinated shifting condition comprising at least one first shifting condition regarding the gear stage that is detected by the detection sensor and at least one second shifting condition regarding the gear stage that is detected by the detection sensor. The controller can control at least one of the first shifting device and the second shifting device to upshift or to downshift, based on at least one coordinated shifting condition stored in the storage device. In this case, instead of the gear ratio, a coordinated shifting condition comprising at least one first shifting condition and at least one second shifting condition can be stored in the storage device; control can be maintained according to the stored coordinated shifting condition. For this reason, a bicycle control apparatus that can realize a simpler control can be provided.

The bicycle control apparatus can further comprise a condition input device. At least one coordinated shifting condition can comprise a plurality of coordinated shifting conditions, and the controller can control at least one of the first shifting device and the second shifting device, based on the coordinated shifting condition that is selected via the condition input device. In this case, since one of a plurality of coordinated shifting conditions can be selected, shifting can be controlled according to the physical strength, skill, etc. of the user.

The controller can drive the second shifting device after driving the first shifting device. In this case, the first shifting device and the first shifting device do not shift gears at the same time, so smooth shifting can be realized even if the first shifting device and the second shifting device are external shifting devices that shift gears by derailing the chain from a sprocket and hanging the chain on a different sprocket.

The controller can drive the first shifting device after driving the second shifting device. In this case, the first shifting device and the second shifting device do not shift gears at the same time, so smooth shifting can be realized even if the first shifting device and the second shifting device are external shifting devices that shift gears by derailing the chain from a sprocket and hanging the chain on a different sprocket.

The first shifting device can comprise a front derailleur that changes the chain over to one of a plurality of front sprockets. In this case, controlling the front derailleur according to the upshift or the downshift gear changing command becomes simple.

The second shifting device can comprise a rear derailleur that changes the chain over to one of a plurality of rear sprockets. In this case, controlling the rear derailleur according to the upshift or downshift gear changing command becomes simple.

The bicycle control apparatus can further comprise a condition changing input device. The controller can change at least one of the first shift conditions and at least one of the second shifting conditions that are included in the coordinated shifting conditions, based on the condition changing command when a condition changing command is input via the condition changing input device.

The bicycle control apparatus can further comprise a setting input device. The controller can control only either the first shifting device or the second shifting device to upshift or to downshift upon determining a state exists in which the gear stage that is detected by the detection sensor matches a prescribed condition, when a first setting is selected via the setting input device and when a prescribed gear changing command is input via the shifting input device.

The bicycle control apparatus can further comprise a setting input device. The controller can control both the first shifting device and the second shifting device to upshift or to downshift upon determining a state exists in which the gear stage that is detected by the detection sensor matches a prescribed condition, when a second setting has been selected via the setting input device and when a prescribed gear changing command is input via the shifting input device.

According to the present invention, providing a bicycle control apparatus that can realize a simpler control is possible.

In view of the state of the known technology and in accordance with a first aspect of the present disclosure, a bicycle control apparatus is provided that. The bicycle control apparatus basically Also other objects, features, aspects and advantages of the disclosed bicycle control apparatus will become apparent to those skilled in the art from the following detailed description, which, taken in conjunction with the annexed drawings, discloses one embodiment of the bicycle control apparatus.

BRIEF DESCRIPTION OF THE DRAWINGS

Referring now to the attached drawings which form a part of this original disclosure:

FIG. 5 is a first shift table that illustrates one example of a first control mode in a first transmission having two front sprockets and a second transmission having ten rear sprockets;

FIG. 6 is a second gear shift table that illustrates one example of a second control mode in a gear transmission having two front sprockets and ten rear sprockets;

FIG. 8 is a fourth shift table that illustrates one example of a first control mode in a first transmission having three front sprockets and a second transmission having ten rear sprockets;

FIG. 9 is a fifth gear shift table that illustrates one example of a second control mode in a transmission having three front sprockets and ten rear sprockets; and FIG. 10 is a sixth gear shift table that illustrates one example of a third control mode in a transmission having three front sprockets and ten rear sprockets.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
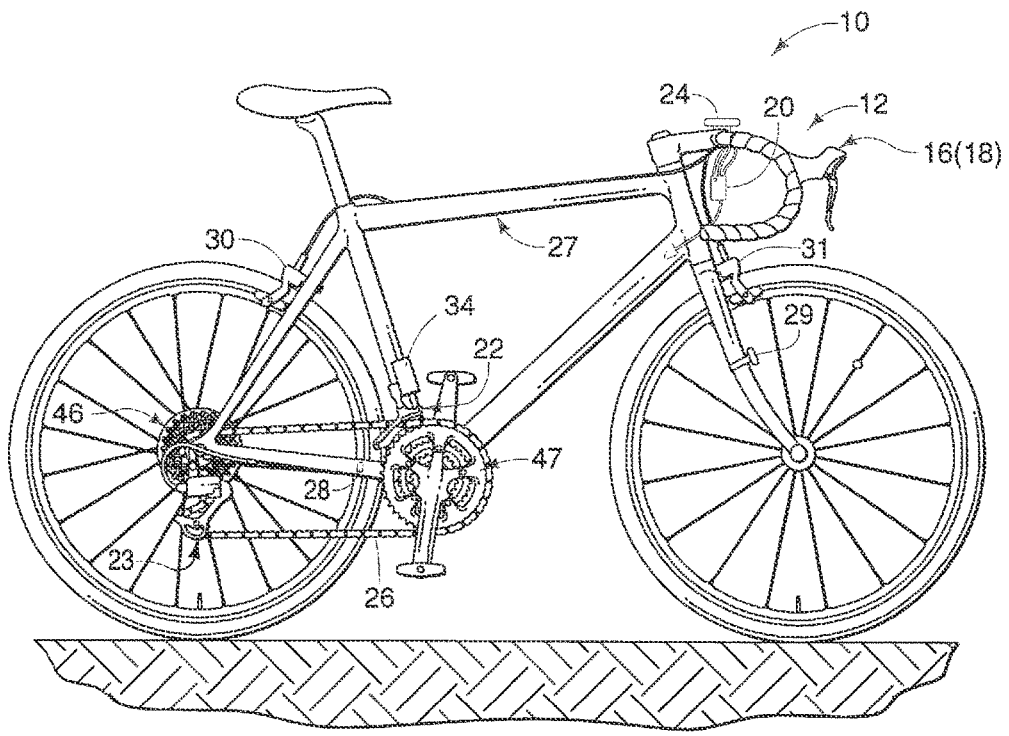
FIG. 1 is a side elevational view of a bicycle that employs a bicycle gear changing control apparatus according to one embodiment.

Referring initially to FIG. 1, a bicycle 10 is illustrated that is equipped with a gear changing control apparatus 12 (e.g., a bicycle control apparatus) in accordance with a first embodiment. A road bike is depicted as the bicycle 10, but the gear changing control apparatus 12 is not limited to use in a road bike as depicted in FIG. 1; the apparatus can be applied to any other type of bicycle, including mountain bikes.

Figure 2:
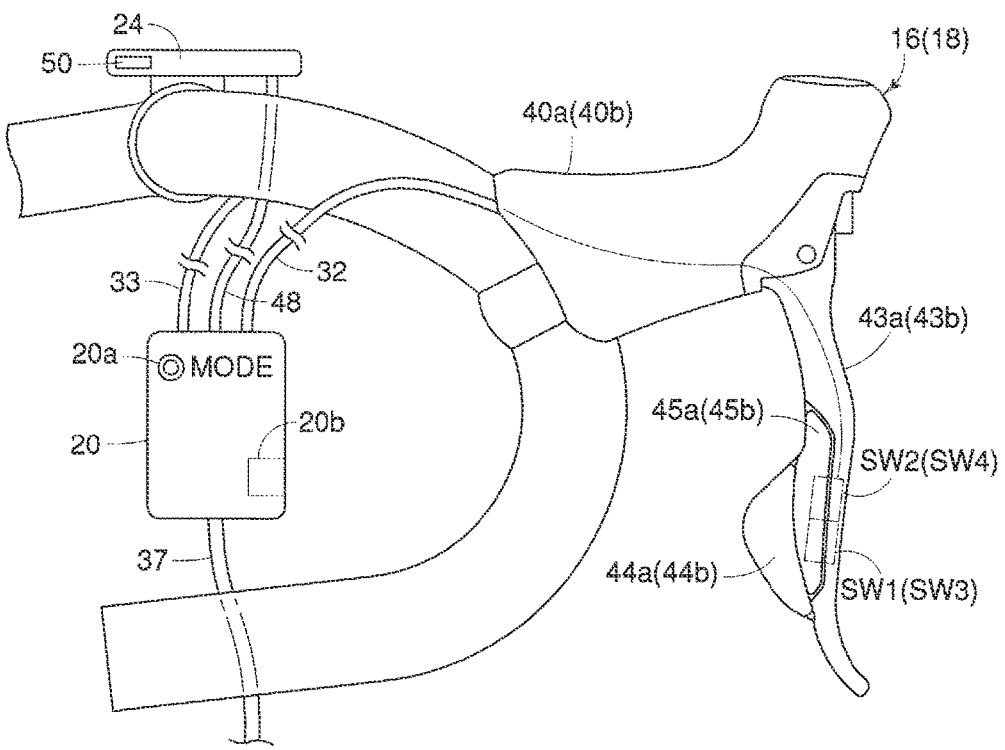
FIG. 2 is a side view of bicycle handlebars mounted with the bicycle gear changing control apparatus in accordance with the illustrated embodiment.
Figure 3:
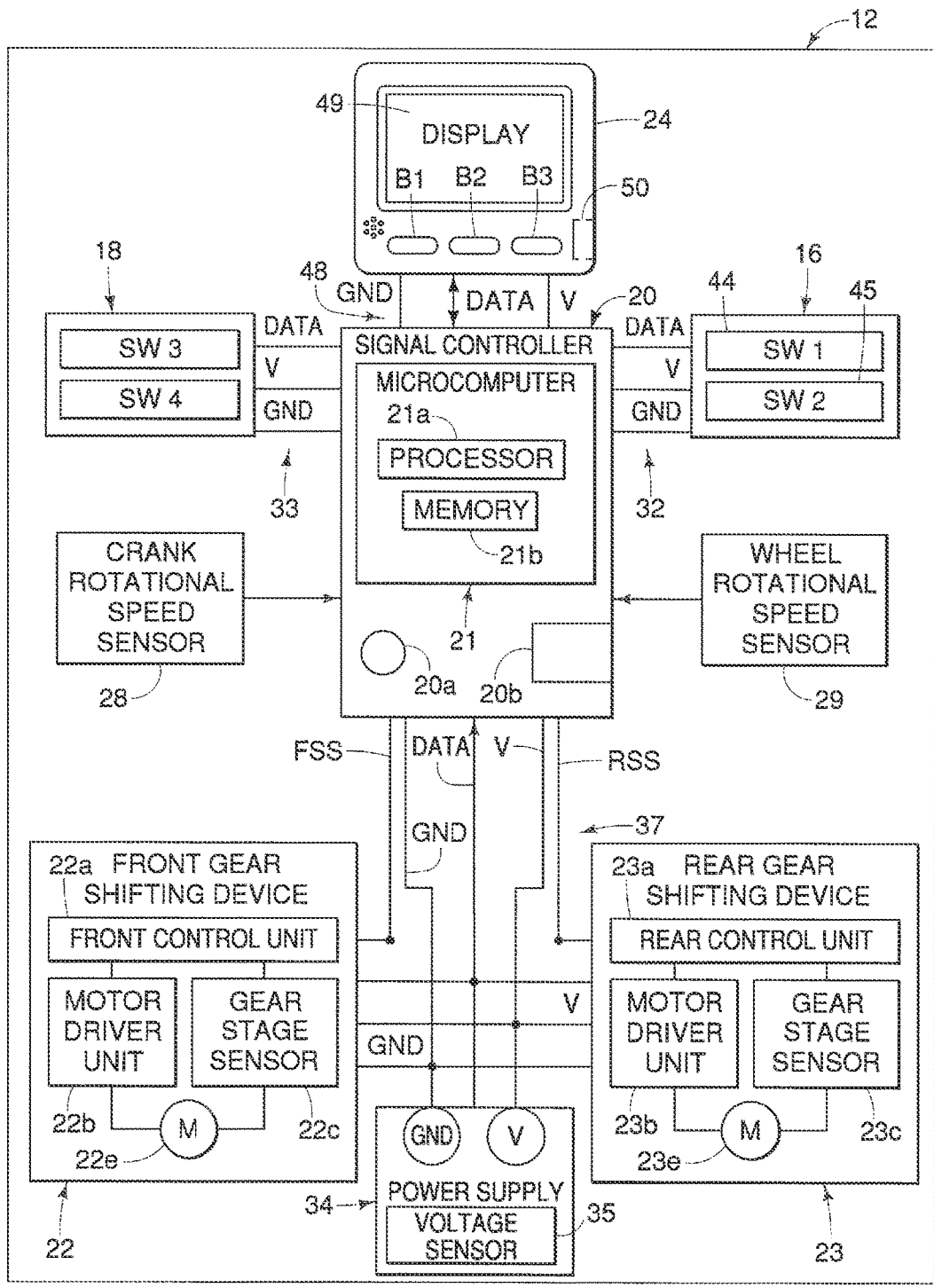
FIG. 3 is a schematic block diagram showing a system configuration that includes the bicycle gear changing control apparatus in accordance with the illustrated embodiment.

Referring to FIGS. 1 to 3, the gear changing control apparatus 12 is one part of a bicycle electric gear shift system. The gear changing control apparatus 12 is one example of a bicycle control apparatus that comprises a first gear changing operating device 16 and a second gear changing operating device 18. Additionally, the gear changing control apparatus 12 further comprises a signal controller 20, a front gear shifting device 22 (one example of a first shifting device), a rear gear shifting device 23 (one example of a second shifting device), a cycle computer 24, a power supply 34, and a power supply sensor 35, i.e., a voltage sensor. The gear changing control apparatus 12 also comprises a crank rotational speed sensor 28 and a wheel rotational speed sensor 29. The front gear shifting device 22 comprises a plurality of first gear stages. The rear gear shifting device 23 comprises a plurality of second gear stages. The crank rotational speed sensor 28 is configured to detect the cadence. The wheel rotational speed sensor 29 is configured to detect the speed of the bicycle 10.

As shown in FIGS. 1 and 2, the first gear changing operating device 16 and the second gear changing operating device 18 are installed on curved portions of a drop handlebar. The first gear changing operating device 16 is fixed to the curved portion on the right side of the handlebar, as seen from the rear. The first gear changing operating device 16 has a first base member 40a that is fixed to the curved portion. For example, a first brake lever 43a is pivotally mounted to the first base member 40a for braking a front brake device 31 (or a rear brake device 30). A first gear changing operating member 44a and a second gear changing operating member 45a that are pivotal around an axis that is different from the first brake lever 43a is provided on the first brake lever 43a. The first gear changing operating member 44a is provided in order to press a first switch SW1. The second gear changing operating member 45a is provided in order to press a second switch SW2. The first gear changing operating device 16 is configured to change the gears of the rear gear shifting device 23. The first brake lever 43a is mechanically coupled with the front brake device 31 via a Bowden cable.

The second gear changing operating device 18 is a member that has a mirror image relationship with the first gear changing operating device 16. The second gear changing operating device 18 comprises a second base member 40b that is fixed to the left side of the handlebars, as seen from the rear. For example, a second brake lever 43b is pivotally mounted to the second base member 40b for braking the rear brake device 30. The second brake lever 43b is provided with a third gear changing operating member 44b and a fourth gear changing operating member 45b that are pivotal around an axis that is transverse to the second brake lever 43b. The third gear changing operating member 44b is provided in order to press a third switch SW3. The fourth gear changing operating member 45b is provided in order to press a fourth switch SW4. The second gear changing operating device 18 is configured to change the gears of the front gear shifting device 22. The second brake lever 43b of the second gear changing operating device 18 is mechanically coupled to the rear brake device 30 via a Bowden cable.

The first gear changing operating device 16 and 18 are each electrically connected to the signal controller 20 by electrical wirings 32 and 33. Meanwhile, the rear brake device 30 and the front gear shifting device 22 can be coupled with the first gear changing operating device 16 and the front brake device 31, and the rear gear shifting device 23 can be coupled with the second gear changing operating device 18.

The signal controller 20 is one example of a controller. The signal controller 20 is configured to shift the gears of the rear gear shifting device 23 and the front gear shifting device 22 in response to the gear changing signal by the operation of the first gear changing operating device 16 and the second gear changing operating device 18 or in response to the gear changing signal corresponding to the speed. The signal controller 20 comprises a microcomputer 21.

The microcomputer 21 comprises a microprocessor 21a and a memory 21b. The microprocessor 21a and the memory 21b are configured to process signals from various sensors, including a voltage sensor 35, and from the components of the gear changing control apparatus 12. The signal controller 20 further comprises a shift control program. The shift control program controls the operation of the front gear shifting device 22 and the rear gear shifting device 23, as mentioned below. The shift control program is stored in the memory 21b.

The memory 21b comprises a ROM (Read Only Memory) device and a RAM (Random Access Memory) device.

The memory 21b is one example of a storage device that is configured to store the coordinated shifting conditions M1, M2, and M3 mentioned below both for two gear stages and for three gear stages.

As shown schematically in FIG. 3, the signal controller 20 is electrically connected to the other parts of the gear changing control apparatus 12. This disclosure clearly shows that the communication with the other parts of the gear changing control apparatus 12 can be a wireless, rather than a wired, communication in order to transmit and receive data.

The signal controller 20 interprets and executes commands (data, signals, and commands) from hardware and various programs for operating the gear changing control apparatus 12. Meanwhile, the signal controller 20 is in FIG. 3 configured as a single body. However, the signal controller 20 can also be configured as a part of another configuration. Additionally, the signal controller 20 can be configured by a plurality of controllers that are provided to different parts.

In the present embodiment, the signal controller 20 comprises a mode button 20a that can select between two shift modes; a manual shifting mode that changes gears according to the operation of the first gear changing operating device 16 and the second gear changing operating device 18; and an automatic shifting mode that changes the gears according to the traveling state of the bicycle 10, such as the speed or the cadence of the bicycle 10. The manual shifting mode and the automatic shifting mode both have a synchro mode that coordinates and controls the front gear shifting device 22 and the rear gear shifting device 23; they also have a non-synchro mode that controls the front gear shifting device 22 and the rear gear shifting device 23 individually. Therefore, in the manual shifting mode and the automatic shifting mode, both the synchro mode and non-synchro mode shifting modes can be alternatively selected with a mode button 20a, and the front gear shifting device 22 and the rear gear shifting device 23 can be shifted gears with the selected shifting mode. When the shifting mode is in the synchro mode, for example, as shown in FIG. 5, in a state in which the gear stage that is detected by the detecting section matches a prescribed condition, in the case that a prescribed shift command is input, the signal controller 20 controls at least one of the front gear shifting device 22 and the rear gear shifting device 23 to upshift or to downshift. In FIG. 5, the prescribed gear stages for upshifting are the Low stage for the front gear shifting device 22 and the third stage for the rear gear shifting device 23.

The first gear changing operating member 44a and the second gear changing operating member 45a of the first gear changing operating device 16 during synchro mode of manual shifting are examples of a shifting input device for inputting the shift command. The third gear changing operating member 44b during the synchro mode can be a selection operation unit for selecting the coordinated shifting conditions M1, M2, and M3, mentioned below.

Meanwhile, changing the shifting mode, instead of the mode button 20a, can be done by operating the first gear changing operating device 16 or the second gear changing operating device 18 or by operating the buttons B1, B2, and B3 of the cycle computer 24.

When in the manual shifting mode, the signal controller 20, according to a signal that has been output by the operation of the first gear changing operating device 16 and the second gear changing operating device 18, outputs a signal that controls the front gear shifting device 22 and the rear gear shifting device 23 individually or in cooperation to at least one of the front gear shifting device 22 and the rear gear shifting device 23.

When in the automatic shifting mode, the signal controller 20, will generate a signal for controlling the front gear shifting device 22 and the rear gear shifting device 23 individually or in cooperation, according to a speed signal that is calculated from the output of the wheel rotational speed sensor 29; the controller outputs the signal to at least one of the front gear shifting device 22 and the rear gear shifting device 23.

As shown in FIG. 1, the first shifting device, i.e., the front gear shifting device 22, comprises an electric front derailleur having a plurality of gear stages (for example, two or three gear stages). The electric front derailleur changes the chain 26 over to one of a plurality (for example, two or three) of front sprockets 47 with different diameters. In the present embodiment, the front sprocket 47 comprises two front sprockets 47 with different diameters (corresponding to FIGS. 5 to 7) or three front sprockets 47 with different diameters (corresponding to FIGS. 8 to 10). The front sprockets 47 are disposed so that the diameter becomes sequentially larger when moving from near to farther from the center axis of the bicycle.

In this embodiment, for example, when there are two front sprockets 47, the gear stage of the front gear shifting device 22 includes a Low stage and a Top stage. Of the gear stages of the front gear shifting device 22, the Low stage is in a position that is closest to the center axis of the bicycle, and the Top stage is in a position that is farthest from the center axis of the bicycle. Also, for example, when there are three front sprockets 47, the gear stage of the front gear shifting device 22 includes a Low stage, a Mid stage, and a Top stage. Of the gear stages of the front gear shifting device 22, the Low stage is in a position that is closest to the center axis of the bicycle, the Top stage is in a position that is farthest from the center axis of the bicycle, and the Mid stage is in between thereof.

As shown in FIG. 3, the front gear shifting device 22 comprises a front control unit 22a, a motor driver unit 22b, a gear stage sensor 22c, and a motor 22e in the same way as a conventional electric derailleur. The gear stage sensor 22c is one example of a detecting section and a first detecting section. The front control unit 22a controls the motor driver unit 22b based on the gear changing control signal corresponding to the operation of the first gear changing operating device 16 or the second gear changing operating device 18 or based on the gear changing control signal corresponding to the speed (or cadence). The motor 22e moves a chain guide of the front gear shifting device 22 laterally closer to and away from the frame 27.

As shown in FIG. 1, the second shifting device, i.e., the rear gear shifting device 23 comprises an electric rear derailleur having a plurality of second gear stages (for example, ten gear stages). The electric rear derailleur changes the chain 26 over to one of a plurality of (for example, ten) rear sprockets 46 with different diameters. The rear sprockets 46 are disposed so that the diameter becomes sequentially smaller when moving from near to farther from the center axis of the bicycle.

In this embodiment, for example, the gear stage of the rear gear shifting device 23 comprises a first stage through a tenth stage. Of the gear stages of the rear gear shifting device 23, the first stage is in a position that is closest to the center axis of the bicycle, and the tenth stage is in a position that is farthest from the center axis of the bicycle.

As shown in FIG. 3, the rear gear shifting device 23 comprises a rear control unit 23a, a motor driver unit 23b, a gear stage sensor 23c, and a motor 23e in the same way as a conventional electric derailleur. The gear stage sensor 23c is one example of a detecting section and a second detecting section. The rear control unit 23a controls the motor driver unit 23b based on the gear changing control signal corresponding to the operation of the first gear changing operating device 16 or the second gear changing operating device 18 or based on the gear changing control signal corresponding to the speed (or cadence). The motor 23e moves the chain guide of the rear gear shifting device 23 laterally closer to and away from the frame 27.

Figure 4:
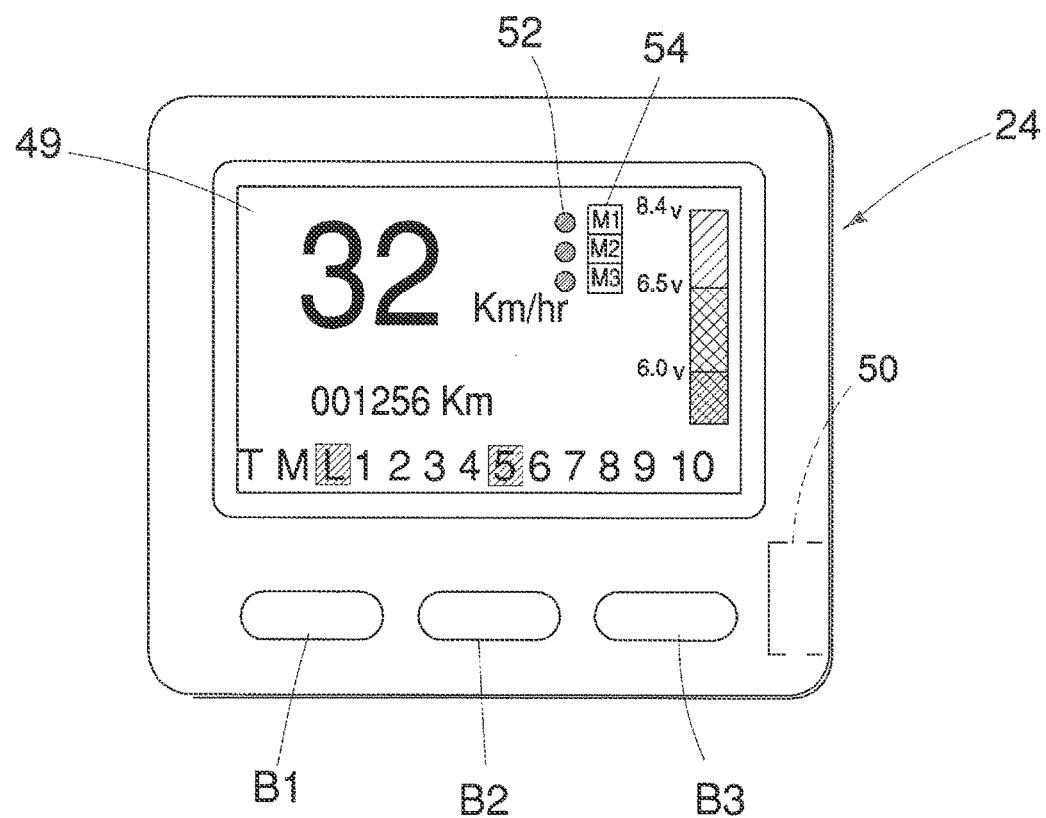
FIG. 4 is an enlarged plan view of a display unit in accordance with the illustrated embodiment.

The cycle computer 24 comprises a microprocessor and a memory. The cycle computer 24, as shown in FIG. 3, is electrically connected to the signal controller 20 by electrical wiring 48. With this, various data can be received from the other parts (the speed, the cadence, the gear stage, etc.). As shown in FIG. 4, the cycle computer 24 comprises a liquid crystal display 49, an input/output port 50 that is configured by a USB (Universal Serial Bus) port, etc., and operating buttons B1, B2, and B3, which are an example of a condition input section or device for selecting the coordinated shifting conditions M1, M2, and M3.

As shown in FIG. 4, the speed, the cadence, the travel distance, the gear stages of the front gear shifting device 22 and the rear gear shifting device 23, and the power level of the power supply 34 are displayed on the liquid crystal display 49. Additionally, the liquid crystal display 49 is able to display a condition display section 52 that shows which of the coordinated shifting conditions M1, M2, or M3 mentioned below is selected, as well as a stage mark 54 that shows if the gear stage of the front gear shifting device 22 is two or three. With this stage mark 54, for example, three circles are lit when the stage is three, and two circles are lit when the stage is two.

The power supply 34 is provided, for example, to the frame 27 of the bicycle 10. The power supply 34 comprises a power storage element, such as a rechargeable secondary battery, a large-capacity capacitor, etc. In the present embodiment, secondary batteries such as a rechargeable lithium-ion battery or a nickel-hydrogen battery are used as the power supply 34. The maximum storage voltage of the power supply 34 is, for example, 8.4 volts. The power supply 34 supplies electric power to each part of the gear changing control apparatus 12, such as the first gear changing operating device 16, the second gear changing operating device 18, the signal controller 20, the front gear shifting device 22, the rear gear shifting device 23, the cycle computer 24, etc.

As shown in FIGS. 2 and 3, the power supply 34 and the signal controller 20 are electrically connected by the electrical wiring 37. With this, electric power is supplied to the signal controller 20. Also, electric power is supplied to the first gear changing operating device 16, the second gear changing operating device 18, and the cycle computer 24 via the signal controller 20. The electrical wiring 37 transmits a gear changing signal (FSS, RSS) and a gear stage signal (DATA) between the signal controller 20 and the front gear shifting device 22 and the rear gear shifting device 23. The electrical wirings 32, 33, and 37 are two-core wiring. In the present embodiment, a PLC (Power Line Communication) circuit board is provided to the signal controller 20, the front gear shifting device 22, and the rear gear shifting device 23.

In the present embodiment, a front gear shifting device 22 with two or three first gear stages and a rear gear shifting device 23 with ten-second gear stages are combined; therefore, a maximum of 30 combinations of gear stages can be obtained.

Here, when in the synchro mode, in a state in which the gear stage detected by at least one of the gear stage sensor 22c and the gear stage sensor 23c matches the prescribed shifting condition, with the user only operating the first gear change operation member 44a for upshifting or the second gear changing operating member 45a for downshifting, the signal controller 20 controls at least one of the front gear shifting device 22 and the rear gear shifting device 23 to upshift or to downshift. Meanwhile, each of the three coordinated shifting conditions M1, M2, and M3 comprises at least one first shifting condition regarding the gear stage that is detected by the gear stage sensor 22$c$ and the gear stage sensor 23$c$ and at least one second shifting condition regarding the gear stage that is detected by the gear stage sensor 22$c$ and the gear stage sensor 23$c$. The first shifting condition is, for example, a condition for upshifting up, and the first shifting condition is, for example, a condition for downshifting. Meanwhile, from FIG. 5 to FIG. 10, the group of gear stages of the rear gear shifting device 23 is described as CS, and the group of gear stages of the front gear shifting device 22 is described as FC.

In the present embodiment, in the case that there are two front sprockets 47 (corresponding to FIGS. 5 to 7), the gear stage of the front gear shifting device 22 comprises a Low stage and a Top stage; in the case that there are three first storage parts 47 (corresponding to FIG. 8 through FIG. 10), the gear stage comprises a Low stage, a Mid stage, and a Top stage. Additionally, the gear stage of the rear gear shifting device 23 comprises the first through the tenth stages.

Next, the three coordinated shifting conditions M1, M2, and M3 of the manual shifting synchro mode when there are two front sprockets 47 will be explained, with reference to FIGS. 5 to 7.

Figure 7:
FIG. 7 is a third gear shift table that illustrates one example of a third control mode in a transmission having two front sprockets and ten rear sprockets.

In FIGS. 5 to 7, each of the coordinated shifting conditions M1, M2, and M3 when there are two front sprockets 47 comprises one first shifting condition and the second shifting condition. The first shifting condition is a condition to control at least the front gear shifting device 22 to upshift, and the second shifting condition is a condition to control at least the front gear shifting device 22 to downshift. In the coordinated shifting condition M1 shown in FIG. 5, the case in which the gear stage of the front gear shifting device 22 is in the Low stage and the gear stage of the rear gear shifting device 23 is in the third stage is the first shifting condition. Additionally, the second shifting condition is when the gear stage of the front gear shifting device 22 is in the Top stage and the gear stage of the rear gear shifting device 23 is in the first stage.

In the coordinated shifting condition M2 shown in FIG. 6, the case in which the gear stage of the front gear shifting device 22 is in the Low stage and the gear stage of the rear gear shifting device 23 is in the fifth stage is the first shifting condition. Additionally, the second shifting condition is when the gear stage of the front gear shifting device 22 is in the Top stage and the gear stage of the rear gear shifting device 23 is in the second stage.

In the coordinated shifting condition M3 shown in FIG. 7, the first shifting condition is the case in which the gear stage of the front gear shifting device 22 is in the Low stage and the gear stage of the rear gear shifting device 23 is in the seventh stage. Additionally, the second shifting condition is when the gear stage of the front gear shifting device 22 is in the Top stage and the gear stage of the rear gear shifting device 23 is in the third stage.

In the coordinated shifting condition M1 shown in FIG. 5, in the case of upshifting, when the first gear changing operating member 44$a$ is operated, the signal controller 20 shifts the rear gear shifting device 23 up each time until the first shifting condition of the coordinated shifting condition M1 has been matched. Then, the rear gear shifting device 23 is upshifted to the third stage; when the first gear changing operating member 44$a$ is operated in a state that matches the first shifting condition, as shown by the solid arrow, the signal controller 20 shifts the front gear shifting device 22 up. Meanwhile, as shown by the dashed arrow in FIG. 5, the rear gear shifting device 23 can be downshifted after upshifting or before upshifting the front gear shifting device 22.

In the case of downshifting, when the second gear changing operating member 45$a$ is operated, the signal controller 20 shifts the rear gear shifting device 23 down each time until the second shifting condition of the coordinated shifting condition M1 has been matched. Then, the rear gear shifting device 23 is downshifted to the first stage; when the second gear changing operating member 45$a$ is operated in a state that matches the first shifting condition, as shown by the solid arrow, the signal controller 20 shifts the front gear shifting device 22 down. Meanwhile, as shown by the dashed arrow in FIG. 5, the rear gear shifting device 23 is upshifted after downshifting or before downshifting the front gear shifting device 22.

In the coordinated shifting condition M2 shown in FIG. 6, in the case of upshifting, when the signal controller 20 shifts the rear gear shifting device 23 up to the fifth stage by the operation of the first gear changing operating member 44$a$, the state will match the first shifting condition. For this reason, the signal controller 20 shifts at least the front gear shifting device 22 up with the next operation of the first gear changing operating member 44$a$. Therefore, the timing for upshifting is slower than the coordinated shifting condition M1. In this case as well, the rear gear shifting device 23 can be downshifted before upshifting or after upshifting the front gear shifting device 22.

In the case of downshifting, when the signal controller 20 shifts the rear gear shifting device 23 down to the second stage by the operation of the second gear changing operating member 45$a$, the state will match the second shifting condition. For this reason, the signal controller 20 shifts at least the front gear shifting device 22 down with the next operation of the second gear changing operating member 45$a$. Therefore, the timing for downshifting is slower than the coordinated shifting condition M1. In this case as well, the rear gear shifting device 23 can be upshifted before downshifting or after downshifting the front gear shifting device 22.

In the coordinated shifting condition M3 shown in FIG. 7, in the case of upshifting, when the signal controller 20 shifts the rear gear shifting device 23 up to the seventh stage by the operation of the first gear changing operating member 44$a$, the state will match the first shifting condition. For this reason, the signal controller 20 shifts at least the front gear shifting device 22 up with the next operation of the first gear changing operating member 44$a$. Therefore, the timing for upshifting is slower than the coordinated shifting condition M2. In this case as well, the rear gear shifting device 23 can be downshifted before upshifting or after upshifting the front gear shifting device 22.

In the case of downshifting, when the signal controller 20 shifts the rear gear shifting device 23 down to the third stage by the operation of the second gear changing operating member 45$a$, the state will match the second shifting condition. For this reason, the signal controller 20 shifts at least the front gear shifting device 22 down with the next operation of the second gear changing operating member 45$a$. Therefore, the timing for downshifting is faster than the coordinated shifting condition M2. In this case as well, the rear gear shifting device 23 can be upshifted before downshifting or after downshifting the front gear shifting device 22.

Next, the three coordinated shifting conditions M1, M2, and M3 of the manual shifting synchro mode when there are three front sprockets 47 will be explained, with reference to FIGS. 8 to 10.

Figure 9:
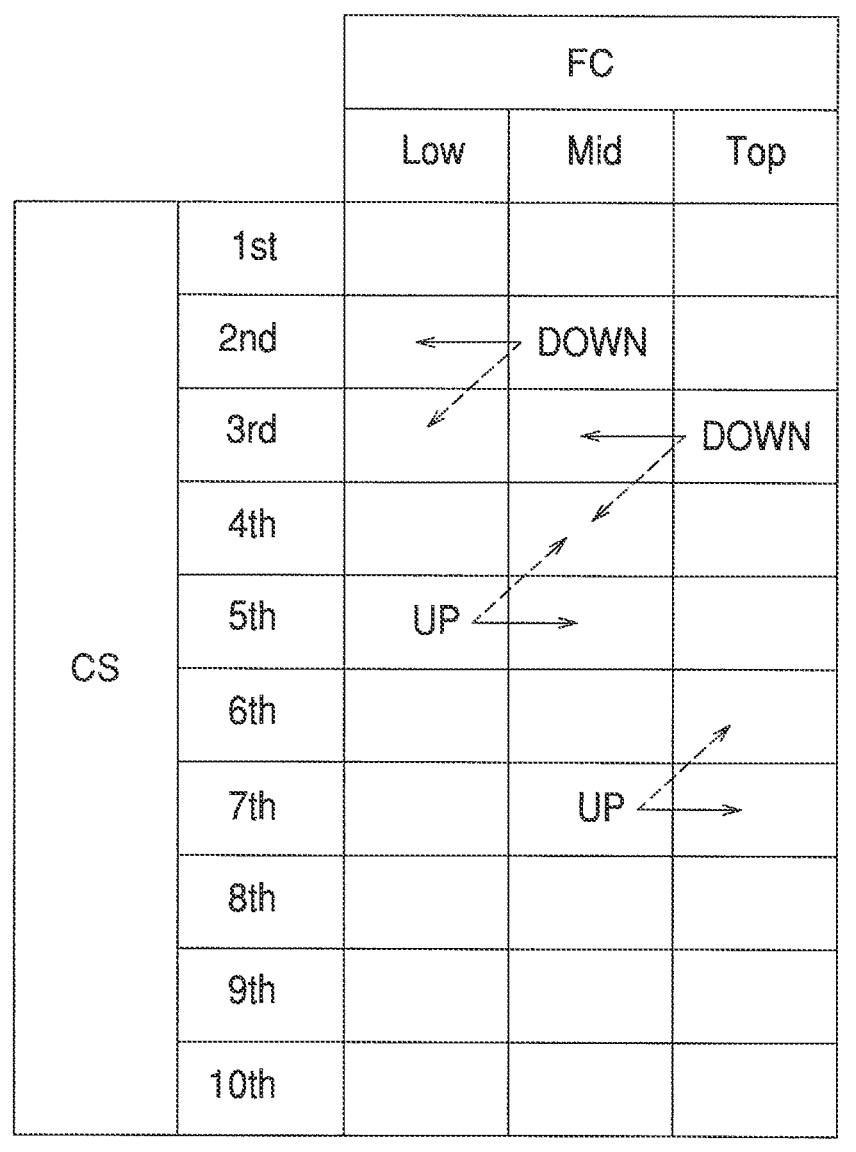

In FIGS. 8 to 10, each of the coordinated shifting conditions M1, M2, and M3 when there are three front sprockets 47 comprises two first shifting conditions and second shifting conditions. One of the first shifting conditions is a condition to shift at least the front gear shifting device 22 up from the Low stage to the Mid stage. The other first shifting condition is a condition to shift at least the front gear shifting device 22 up from the Mid stage to the Top stage.

One of the second shifting conditions is a condition to shift at least the front gear shifting device 22 down from the Top stage to the Mid stage. The other second shifting condition is a condition to shift at least the front gear shifting device 22 down from the Mid stage to the Low stage.

In the coordinated shifting condition M1 shown in FIG. 8, the case in which the gear stage of the front gear shifting device 22 is in the Low stage and the gear stage of the rear gear shifting device 23 is in the fifth stage is one of the first shifting conditions. Additionally, the other first shifting condition is when the gear stage of the front gear shifting device 22 is in the Mid stage and the gear stage of the rear gear shifting device 23 is in the eighth stage. Also, one of the second shifting conditions is when the gear stage of the front gear shifting device 22 is in the Top stage and the gear stage of the rear gear shifting device 23 is in the second stage. The other second shifting condition is when the gear stage of the front gear shifting device 22 is in the Mid stage and the gear stage of the rear gear shifting device 23 is in the first stage.

In the coordinated shifting condition M2 shown in FIG. 9, the case in which the gear stage of the front gear shifting device 22 is in the Low stage and the gear stage of the rear gear shifting device 23 is in the fifth stage is one of the first shifting conditions. The other first shifting condition is when the gear stage of the front gear shifting device 22 is in the Mid stage and the gear stage of the rear gear shifting device 23 is in the seventh stage. Also, one of the second shifting conditions is when the gear stage of the front gear shifting device 22 is in the Top stage and the gear stage of the rear gear shifting device 23 is in the third stage. The other second shifting condition is when the gear stage of the front gear shifting device 22 is in the Mid stage and the gear stage of the rear gear shifting device 23 is in the second stage.

In the coordinated shifting condition M3 shown in FIG. 10, the case in which the gear stage of the front gear shifting device 22 is in the Low stage and the gear stage of the rear gear shifting device 23 is in the fourth stage is one of the first shifting conditions. The other first shifting condition is when the gear stage of the front gear shifting device 22 is in the Mid stage and the gear stage of the rear gear shifting device 23 is in the ninth stage. Additionally, one of the second shifting conditions is when the gear stage of the front gear shifting device 22 is in the Top stage and the gear stage of the rear gear shifting device 23 is in the third stage. The other second shifting condition is when the gear stage of the front gear shifting device 22 is in the Mid stage and the gear stage of the rear gear shifting device 23 is in the second stage.

In the coordinated shifting condition M1 shown in FIG. 8, in the case of upshifting, when the first gear changing operating member 44a is operated, the signal controller 20 shifts the rear gear shifting device 23 up each time until the first shifting condition of the coordinated shifting condition M1 has been matched. Then, the rear gear shifting device 23 is upshifted to the fifth stage; when the first gear changing operating member 44a is operated in a state that matches one of the first shifting conditions, as shown by the solid arrow, the signal controller 20 shifts the front gear shifting device 22 up from the Low stage to the Mid stage. Meanwhile, as shown by the dashed arrow in FIG. 8, the rear gear shifting device 23 can be downshifted after upshifting or before upshifting the front gear shifting device 22.

In this state, when the first gear changing operating member 44a is operated, the signal controller 20 shifts the rear gear shifting device 23 up each time until the other first shifting condition of the coordinated shifting condition M1 has been matched. Then, the rear gear shifting device 23 is upshifted to the eighth stage; when the first gear changing operating member 44a is operated in a state that matches the other first shifting condition, as shown by the solid arrow, the signal controller 20 shifts the front gear shifting device 22 up from the Mid stage to the Top stage. Meanwhile, in the case of the other first shifting condition as well, as shown by the dashed arrow in FIG. 8, the rear gear shifting device 23 can be downshifted after upshifting or before upshifting the front gear shifting device 22.

In the case of downshifting, when the second gear changing operating member 45a is operated, the signal controller 20 shifts the rear gear shifting device 23 down each time until the second shifting condition of the coordinated shifting condition M1 has been matched. Then, the rear gear shifting device 23 is downshifted to the second stage; when the second gear changing operating member 45a is operated in a state that matches one of the second shifting conditions, as shown by the solid arrow, the signal controller 20 shifts the front gear shifting device 22 down from the Top stage to the Mid stage. Meanwhile, as shown by the dashed arrow in FIG. 8, the rear gear shifting device 23 can be upshifted after downshifting or before downshifting the front gear shifting device 22.

In this state, when the second gear changing operating member 45a is operated, the signal controller 20 shifts the rear gear shifting device 23 down each time until the other second shifting condition of the coordinated shifting condition M1 has been matched. Then, the rear gear shifting device 23 is downshifted to the first stage; when the second gear changing operating member 45a is operated in a state that matches the other second shifting condition, as shown by the solid arrow, the signal controller 20 shifts the front gear shifting device 22 down from the Mid stage to the Low stage. Meanwhile, in the case of the other second shifting condition as well, as shown by the dashed arrow in FIG. 8, the rear gear shifting device 23 can be upshifted after downshifting or before downshifting the front gear shifting device 22.

In the coordinated shifting condition M2 shown in FIG. 9, in the case of upshifting, when the first gear changing operating member 44a is operated, the signal controller 20 shifts the rear gear shifting device 23 up each time until one of the first shifting conditions of the coordinated shifting condition M1 has been matched. Then, the rear gear shifting device 23 is upshifted to the fifth stage; when the first gear changing operating member 44a is operated in a state that matches one of the first shifting conditions, as shown by the solid arrow, the signal controller 20 shifts the front gear shifting device 22 up from the Low stage to the Mid stage. Meanwhile, as shown by the dashed arrow in FIG. 9, the rear gear shifting device 23 can be downshifted after upshifting or before upshifting the front gear shifting device 22.

In this state, when the first gear changing operating member 44a is operated, the signal controller 20 shifts the rear gear shifting device 23 up each time until the other first shifting condition of the coordinated shifting condition M2 has been matched. Then, the rear gear shifting device 23 is upshifted to the seventh stage; when the first gear changing operating member 44a is operated in a state that matches the other first shifting condition, as shown by the solid arrow, the signal controller 20 shifts the front gear shifting device 22 up from the Mid stage to the Top stage. Meanwhile, in the case of the other first shifting condition as well, as shown by the dashed arrow in FIG. 9, the rear gear shifting device 23 can be downshifted after upshifting or before upshifting the front gear shifting device 22.

In the case of downshifting, when the second gear changing operating member 45a is operated, the signal controller 20 shifts the rear gear shifting device 23 down each time until one of the second shifting conditions of the coordinated shifting condition M2 has been matched. Then, the rear gear shifting device 23 is downshifted to the third stage; when the second gear changing operating member 45a is operated in a state that matches one of the second shifting conditions, as shown by the solid arrow, the signal controller 20 shifts the front gear shifting device 22 down from the Top stage to the Mid stage. Meanwhile, as shown by the dashed arrow in FIG. 9, the rear gear shifting device 23 can be upshifted after downshifting or before downshifting the front gear shifting device 22.

In this state, when the second gear changing operating member 45a is operated, the signal controller 20 shifts the rear gear shifting device 23 down each time until the other second shifting condition of the coordinated shifting condition M2 has been matched. Then, the rear gear shifting device 23 is downshifted to the second stage; when the second gear changing operating member 45a is operated in a state that matches the other second shifting condition, as shown by the solid arrow, the signal controller 20 shifts the front gear shifting device 22 down from the Mid stage to the Low stage. Meanwhile, in the case of the other second shifting condition as well, as shown by the dashed arrow in FIG. 9, the rear gear shifting device 23 can be upshifted after downshifting or before downshifting the front gear shifting device 22.

In the coordinated shifting condition M3 shown in FIG. 10, in the case of upshifting, when the first gear changing operating member 44a is operated, the signal controller 20 shifts the rear gear shifting device 23 up each time until the first shifting condition of the coordinated shifting condition M3 has been matched. Then, the rear gear shifting device 23 is upshifted to the fourth stage; when the first gear changing operating member 44a is operated in a state that matches one of the first shifting conditions, as shown by the solid arrow, the signal controller 20 shifts the front gear shifting device 22 up from the Low stage to the Mid stage. Meanwhile, as shown by the dashed arrow in FIG. 10, the rear gear shifting device 23 can be downshifted after upshifting or before upshifting the front gear shifting device 22.

In this state, when the first gear changing operating member 44a is operated, the signal controller 20 shifts the rear gear shifting device 23 up each time until the other first shifting condition of the coordinated shifting condition M3 has been matched. Then, the rear gear shifting device 23 is upshifted to the ninth stage; when the first gear changing operating member 44a is operated in a state that matches the other first shifting condition, as shown by the solid arrow, the signal controller 20 shifts the front gear shifting device 22 up from the Mid stage to the Top stage. Meanwhile, in the case of the other first shifting condition as well, as shown by the dashed arrow in FIG. 8, the rear gear shifting device 23 can be downshifted after upshifting or before upshifting the front gear shifting device 22.

In the case of downshifting, when the second gear changing operating member 45a is operated, the signal controller 20 shifts the rear gear shifting device 23 down each time until one of the second shifting conditions of the coordinated shifting condition M3 has been matched. Then, the rear gear shifting device 23 is downshifted to the third stage; when the second gear changing operating member 45a is operated in a state that matches one of the second shifting conditions, as shown by the solid arrow, the signal controller 20 shifts the front gear shifting device 22 down from the Top stage to the Mid stage. Meanwhile, as shown by the dashed arrow in FIG. 10, the rear gear shifting device 23 can be upshifted after downshifting or before downshifting the front gear shifting device 22.

In this state, when the second gear changing operating member 45a is operated, the signal controller 20 shifts the rear gear shifting device 23 down each time until the other second shifting condition of the coordinated shifting condition M3 has been matched. Then, the rear gear shifting device 23 is downshifted to the second stage; when the second gear changing operating member 45a is operated in a state that matches the other second shifting condition, as shown by the solid arrow, the signal controller 20 shifts the front gear shifting device 22 down from the Mid stage to the Low stage. Meanwhile, in the case of the other second shifting condition as well, as shown by the dashed arrow in FIG. 10, the rear gear shifting device 23 can be upshifted after downshifting or before downshifting the front gear shifting device 22.

In this kind of gear changing control apparatus 12, at least one of the front shifting device 22 and the rear shifting device 23 is controlled to upshift or to downshift at a prescribed gear stage; therefore, a bicycle control apparatus that can realize a simpler control can be provided.

Other Embodiments (a) In the above-described embodiment, a front derailleur was exemplified as the first shifting device, and a rear derailleur was exemplified as the second shifting device; however, the present invention is not limited to this. For example, the first shifting device can be an internal transmission or a gearbox. The second shifting device can also be an internal transmission hub.

(b) The set of teeth and the coordinated shifting condition disclosed in the above-described embodiment are one example, and the present invention is not limited to these. Specifically, in the above-described embodiment, there were three coordinated shifting conditions; however, the configuration is not limited to this and can comprise two or fewer coordinated shifting conditions; alternatively, the configuration can comprise four or more coordinated shifting conditions. Additionally, the first shifting condition and the second shifting condition of the coordinated shifting conditions M1, M2, and M3 can be configured to be changeable. In this case, the signal controller 20 can change the first shifting condition and the second shifting condition of the coordinated shifting conditions M1, M2, and M3, based on a condition changing command that is input via the input/output port 50 as the condition changing input section or device. This condition changing command can be generated by a shifting condition changing program that is stored in an information terminal, such as a personal computer, which is not diagrammed.

(c) In the above-described embodiment, the first gear changing operating member 44a and the second gear changing operating member 45a are provided to the brake lever; however, the first gear changing operating member and the second gear changing operating member can be provided separately from the brake lever, for example, on the handlebars.

(d) In the above-described embodiment, when in the manual transmission synchro mode, upshifting is done by the first gear changing operating member 44a, and downshifting is done by the second gear changing operating member 45a; however, these settings can be freely set with software. For example, it can be set so that the first gear changing operating member 44a carries out one of either the upshift operation or the downshift operation, and be set so that the second gear changing operating member 45a carries out the other of either the upshift operation or the downshift operation.

(e) In the above-described embodiment, the present invention was explained with the manual shift synchro mode as an example, but the present invention is not limited to this. For example, the present invention can also be applied to an automatic shift synchro mode. In this case, the shifting input device can be a gear changing signal that is generated by the signal controller 20 according to the speed or the cadence.

(f) In the above-described embodiment, the signal controller 20 can be configured to control only the front gear shifting device 22 as the first shifting device when a first setting is selected and both the front gear shifting device 22 as the first shifting device and the rear gear shifting device 23 as the second shifting device when a second setting is selected to upshift or downshift in a state in which the gear stage that has been detected by at least one of the gear stage sensors 22c and 23c matches a prescribed condition. Specifically, when the first setting is selected, the signal controller 20 can upshift or downshift only the front gear shifting device 22, as shown by the solid arrows in FIGS. 5 through 10. Also, when the second setting has been selected, as shown by the dashed arrow in FIGS. 5 through 10, the signal controller 20 can upshift or downshift the rear gear shifting device 23 before upshifting or downshifting the front gear shifting device 22; or, the signal controller can upshift or downshift the rear gear shifting device 23 after upshifting or downshifting the front gear shifting device 22. In this case, the operating buttons B1, B2, and B3 of the cycle computer 24 are an example of the setting input section or device, and the stage mark 54 is configured so that the illumination pattern (including, for example, constant illumination and blinking) will differ between when the first setting has been selected and when the second setting has been selected.

(g) In the above-described embodiment, the signal controller 20 can be configured so that, when the third gear changing operating member 44b of the second gear changing operating device 18 is operated, when the gear stage of the front gear shifting device 22 at that point in time is not the Top stage, the front gear shifting device 22 is forcibly upshifted; when the fourth gear changing operating member 45b of the second gear changing operating device 18 is operated, when the gear stage of the front gear shifting device 22 at that point in time is not the Low stage, the front gear shifting device 22 is forcibly downshifted.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control apparatus. Accordingly, these directional terms, as utilized to describe the bicycle control apparatus should be interpreted relative to a bicycle in an upright riding position on a horizontal surface and that is equipped with the bicycle control apparatus. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus for controlling at least one of a first shifting device having a plurality of gear stages and a second shifting device having a plurality of gear stages, the bicycle control apparatus comprising:
   a manually operated shifting input device configured to input a shift command;
   a first detection sensor that detects the gear stage of a first shifting device;
   a second detection sensor that detects the gear stage of a second shifting device; and
   a controller programmed to selectively control the first shifting device and the second shifting device in accordance with a manual shifting mode having a synchro mode,
   in the synchro mode of the manual shifting mode, the controller being further programmed to selectively perform at least one of an upshift and a downshift of at least one of the first and second shifting devices upon determining a state exists in which the gear stage detected by at least one of the first and second detection sensors matches a prescribed condition that is a stored gear stage of at least one of the first and second shifting devices, and upon receiving a shift command that is manually inputted via the shifting input device,
   the controller being further programmed to control the first and second shifting devices in accordance with at least one coordinated shifting condition based on the gear stages of the first and second shifting devices that are detected by the first and second shifting sensors.

2. The bicycle control apparatus as recited in claim 1, wherein
   the controller is programmed to selectively perform at least one of an upshift and a downshift of at least one of the first and second shifting devices upon determining a state exists in which the gear stage detected by the first detection sensor and the gear stage detected by the second detection sensor match the stored gear stage of the prescribed condition, and upon receiving the prescribed shift command that is inputted via the shifting input device.

3. The bicycle control apparatus as recited in claim 1, wherein
   the controller is programmed to upshift the first shifting device in response to a first shift command being input via the shifting input device and upon determining a state exists in which the gear stage detected by the first detection sensor matches a shifting condition of the stored gear stage.

4. The bicycle control apparatus as recited in claim 3, wherein
   the controller is programmed to downshift the second shifting device in response to a first shift command being inputted via the shifting input device and upon determining a state exists in which the gear stage detected by the second detection sensor matches the shifting condition of the stored gear stage.

5. The bicycle control apparatus as recited in claim 1, wherein
   the controller is programmed to downshift the first shifting device in response to a second shift command being inputted via the shifting input device and upon determining a state exists in which the gear stage detected by at least one of the first and second detection sensors matches a second shifting condition of the stored gear stage.

6. The bicycle control apparatus as recited in claim 5, wherein
   the controller is programmed to upshift the second shifting device in response to the second shift command being inputted via the shifting input device and upon determining a state exists in which the gear stage detected by at least one of the first and second detection sensors matches the second shifting condition of the stored gear stage.

7. The bicycle control apparatus as recited in claim 1, wherein
   the controller further includes a storage device that is configured to store the at least one coordinated shifting condition comprising a first shifting condition of the stored gear stage corresponding to the gear stage that is detected by at least one of the first and second detection sensors and a second shifting condition of the stored gear stage corresponding to the gear stage that is detected by at least one of the first and second detection sensors, and
   the controller is programmed to perform at least one an upshift and a downshift of the first and second shifting devices based on the at least one coordinated shifting condition stored in the storage device.

8. The bicycle control apparatus as recited in claim 7, further comprising
   a condition input device operatively coupled to the controller to select the at least one coordinated shifting condition, which comprises a plurality of coordinated shifting conditions, and
   the controller being programmed to control at least one of the first and second shifting devices based on the coordinated shifting condition that has been selected via the condition input device.

9. The bicycle control apparatus as recited in claim 7, further comprising
   a condition input device operatively coupled to the controller to select the at least one coordinated shifting condition, and
   the controller being programmed to change at least one of the first shift conditions and at least one of the second shifting conditions that are included in the at least one coordinated shifting condition based on a condition changing command being inputted via a condition changing input port.

10. The bicycle control apparatus as recited in claim 7, wherein
    the controller is programmed to shift the first shifting device to match the at least one first shifting condition, and programmed to shift the second gear shifting device to match the at least one second shifting condition.

11. The bicycle control apparatus as recited in claim 1, wherein
    the controller is programmed to first drive the first shifting device, and then after which the controller drives the second shifting device.

12. The bicycle control apparatus as recited in claim 1, wherein
    the controller is programmed to first drive the second shifting device, and then after which the controller drives the first shifting device.

13. The bicycle control apparatus as recited in claim 1, wherein
   the first shifting device comprises a front derailleur that changes a chain over to one of a plurality of front sprockets.

14. The bicycle control apparatus as recited in claim 1, wherein
   the second shifting device comprises a rear derailleur that changes a chain over to one of a plurality of rear sprockets.

15. The bicycle control apparatus as recited in claim 1, further comprising
   a setting input device, and
   the controller being programmed to control only one of the first and second shifting devices to upshift or downshift upon determining a state exists in which the gear stage detected by at least one of the first and second detection sensors matches the prescribed condition, in response to a first setting has been selected via the setting input device.

16. The bicycle control apparatus as recited in claim 1, further comprising
   a setting input device, and
   the controller controls both the first and second shifting devices to upshift or to downshift upon determining a state exists in which the gear stage detected by the at least one detection sensor matches the prescribed condition, when a second setting has been selected via the setting input device.

\* \* \* \* \*